United States Patent
Kaytan

(10) Patent No.: US 9,145,487 B2
(45) Date of Patent: *Sep. 29, 2015

(54) PLASTICIZED PVC COMPOSITIONS WITH LONG TERM HIGH TEMPERATURE STABILITY

(75) Inventor: Hasan Kaytan, Huerth (DE)

(73) Assignee: ISP INVESTMENTS INC., Wilmington, DE (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/936,493

(22) PCT Filed: Apr. 6, 2009

(86) PCT No.: PCT/US2009/039600
§ 371 (c)(1),
(2), (4) Date: Dec. 14, 2010

(87) PCT Pub. No.: WO2009/126552
PCT Pub. Date: Oct. 15, 2009

(65) Prior Publication Data
US 2011/0129629 A1 Jun. 2, 2011

Related U.S. Application Data

(60) Provisional application No. 61/043,929, filed on Apr. 10, 2008.

(51) Int. Cl.
*B32B 1/08* (2006.01)
*C08K 5/3415* (2006.01)
*C08K 5/526* (2006.01)

(52) U.S. Cl.
CPC ............... *C08K 5/3415* (2013.01); *C08K 5/526* (2013.01); *Y10T 428/139* (2015.01)

(58) Field of Classification Search
CPC .......... B32B 1/02; B32B 1/08; C08K 5/3415; C08K 5/526
USPC .................. 428/36.9, 35.7; 521/145; 524/104
See application file for complete search history.

(56) References Cited

U.S. PATENT DOCUMENTS

| | | | | | |
|---|---|---|---|---|---|
| 4,611,019 | A | * | 9/1986 | Lutzmann et al. | 524/169 |
| 4,624,978 | A | * | 11/1986 | Frayer | 524/104 |
| 5,055,507 | A | * | 10/1991 | Haruna et al. | 524/117 |
| 2004/0183054 | A1 | | 9/2004 | Stevenson et al. | |
| 2007/0112104 | A1 | | 5/2007 | Kaytan | |

* cited by examiner

*Primary Examiner* — Erik Kashnikow
(74) *Attorney, Agent, or Firm* — William J. Davis

(57) ABSTRACT

A stable, plasticized composition of PVC polymer including a $C_4$-$C_{30}$ alkyl pyrrolidone to plasticize said PVC into a flexible state and an organic phosphite ester stabilizer to impart long term high temperature stability.

7 Claims, 1 Drawing Sheet

|  | 0' | 10' | 20' | 30' | 40' | 50' | 60' | 70' | 80' | 90' |
|---|---|---|---|---|---|---|---|---|---|---|
| Ba/Zn | | | | | | | | | | |
| OBS | | | | | | | | | | |
| PhosBooster | | | | | | | | | | |

FIG. 1

|  | 0' | 10' | 20' | 30' | 40' | 50' | 60' | 70' | 80' | 90' | 100' | 110' | 120' |
|---|---|---|---|---|---|---|---|---|---|---|---|---|---|
| PhosBooster | | | | | | | | | | | | | |

FIG. 2

PLASTICIZED PVC COMPOSITIONS WITH LONG TERM HIGH TEMPERATURE STABILITY

CROSS-REFERENCE TO RELATED APPLICATIONS

This application is the National Stage of International Application Number PCT/US09/039600 filed Apr. 6, 2009, which claims the benefit of Provisional Application No. 61/043,929 filed Apr. 10, 2008 to which applicant claim the benefit priority under 35 USC §365 (c) and 119(e).

BACKGROUND OF THE INVENTION

1. Field of the Invention

This invention relates to stable plasticized PVC compositions, and, more particularly, to stable alkyl pyrrolidone plasticized PVC compositions comprising an organic phosphite ester stabilizer present in an amount sufficient to provide long term high temperature stability and better color and clarity. The present invention also relates to alkyl pyrrolidone plasticized PVC compositions which are free of heavy metal and solvent, thus exhibiting reduced volatile organic compounds (VOC) emissions. The present invention also relates to the use of stable alkyl pyrrolidone plasticized PVC compositions in medical tubing, roofing membranes, vinyl flooring, refrigerator gaskets, paints, adhesives, textile auxiliaries, film coating, fabric, wall paper coatings, etc.

2. Description of the Prior Art

U.S. application Pub. No. US 20070112104 A1 describes a new class of alkyl pyrrolidone plasticizers which provide long term plastification to PVC so as to impart flexibility, softness, extensibility and or/lower melting temperature to PVC compositions. The present invention provides improved stable alkyl pyrrolidone plasticized PVC having excellent early color performance while maintaining good processing heat stability at higher temperatures.

Poly(vinyl chloride), hereafter referred to as PVC, is extensively used in many applications. In use, PVC is plasticized to permit it to be processed into a flexible material. In addition, other additives such as thermal stabilizers, lubricants, pigments, fillers, impact modifiers, and flame retardants are generally employed to produce PVC compositions having desired properties.

It is known in the prior art that plasticization of PVC makes it useful for various applications, however during the plasticization process, due to high temperature, PVC tends to degrade by various processes like dehydrochlorination, auto-oxidation, mechano-chemical chain scission, cross linking of macromolecules and condensation reactions. Yellow discoloration, resulting from the formation of conjugated polyene sequences of 5 to 30 double bonds of the polymer, indicates the start of primary degradation process, which on subsequent secondary reaction results in cross linking or the cleaving of the polymer chain. These changes lead to altered physio-mechanical and rheological properties of PVC.

A number of stabilizing systems have been proposed to reduce the degradation and thus maintain early color and clarity. The chief purpose of a heat stabilizer is to prevent discoloration during the processing of the PVC at high temperature. Degradation of PVC polymer begins with the evolution of hydrogen chloride at about 100° C. and accelerates exponentially at higher temperatures. Thus the heat stabilizer ideally must inhibit or prevent the dehydrochlorination reaction that is the primary process in degradation.

Typically various stabilizers have been used to tackle such situations. The most common, well established and conventionally used heat stabilizers are tin based organotin compounds such as organotin mercaptides, lead based stabilizers and the mixed metal type stabilizers containing barium/zinc/cadmium combinations. However, these stabilizers are associated with many drawbacks such as heavy metal toxicity, environmental safety concerns coupled with VOC emissions, and the strong and repulsive odor linked with mercaptides. Additionally, high cost is also linked with metal based stabilizers.

Thus it is very much desired to have a cost effective compatible stabilizer, which is free of the above mentioned shortcomings. More particularly, it is desired to have sufficiently flexible plasticized PVC having excellent heat stability at higher temperatures for sufficiently longer duration.

The prior art disclosing attempts to solve the above mentioned problems are exemplified in U.S. Pat. Nos. 5,575,951; 5,672,646; 5,656,202; 5,985,958; and 5,859,103.

U.S. Pat. No. 6,667,357 discloses organic thiol compounds which can be utilized to plasticize and stabilize halogen-containing polymer compositions against deterioration and color change that typically occurs during the processing of PVC polymer.

U.S. Pat. No. 7,320,764, assigned to Dover Chemical Corporation, discloses the Phosbooster® stabilizer series. Blends of phosphite esters with zinc for improving the performance and reducing the heavy metal content of PVC compositions are described.

SUMMARY OF THE INVENTION

I have discovered improved plasticized PVC compositions having prolonged heat stability at temperatures higher than from about 140° C. to about 200° C. More particularly, the present invention provides stable alkyl pyrrolidone plasticized PVC compositions having long term plastification and high temperature stability and which provide better initial color and clarity for various applications. The present invention also provides heat stable plasticized PVC compositions which are cost effective, environmentally safe and free of metal components and VOCs.

In accordance with the present invention there is provided a stable plasticized composition of PVC polymer comprising:
(a) an alkylpyrrolidone plasticizer; and
(b) an organic phosphite ester stabilizer in an amount sufficient to prolong heat stability at temperatures higher than from about 140° C., preferably 180° C., to about 200° C.

It is an object of the invention to provide a stable plasticized composition of PVC polymer comprising an organic phosphite ester stabilizer selecting from the group consisting of aryl phosphite, alkyl phosphite, aryl/alkyl phosphite, bisphenol-A phosphite, dialkylene phosphite, pentaerythritol phosphite, p-cumyl phenol phosphite. Alkyl bisphenol-A phosphites are preferred for use herein.

Preferably, the composition of the present invention includes an organic phosphite ester stabilizer in an amount from about 0.5 phr to about 5 phr and more preferably from about 2 phr to about 3 phr.

It is another objective of the present invention to provide stable alkyl pyrrolidone plasticized PVC compositions having about 50 minutes longer heat stability than with other stabilizers systems at temperatures preferably higher than about 180° C.

Another objective of the present invention is to provide such stable plasticized compositions for such applications as films, siding, sheets, pipe and tubing as well as calendered sheets, plastisols, foams and dispersions in a film, siding, pipe or tubing and the like.

BRIEF DESCRIPTION OF THE DRAWINGS

FIG. 1 illustrates a comparative yellowness index of stabilized PVC using three different stabilizers.

FIG. 2 shows the heat resistance of dodecyl pyrrolidone stabilized with PhosBooster 775 at 150° C.

DETAILED DESCRIPTION OF THE INVENTION

This invention provides improved plasticized PVC compositions that do not contain heavy metal such as cadmium or lead thereby minimizing toxicity and environmental concerns and which require less use of solvent carriers responsible for harmful VOC emissions.

Phosbooster® series of PVC stabilizers from Dover Chemical Corporation are a preferred class of organic phosphite esters suitable for use herein. Phosboosters® are organic phosphite esters which are free of heavy metal and solvent. This class of stabilizer is known to be useful in plasticized PVC polymers.

However, we have discovered that unexpectedly exceptionally good results have been observed when organic phosphite ester stabilizers are used in conjunction with alkylpyrrolidone plasticizers.

Preferably linear N-octyl ($C_8$) pyrrolidone (NOP) and linear N-dodecyl ($C_{12}$) pyrrolidone (NDP), which are commercially available as Surfadone® LP-100 and 300, respectively, sold by International Specialty Products (ISP) are preferred plasticizers. These alkyl pyrrolidones perform effectively preferably in an amount of at least 5 phr, more preferably, 10100 phr of the PVC. This amount is sufficient to plasticize the PVC into a flexible state. It has been further found that these alkyl pyrrolidones are useful with or without stabilizersin amounts as low as 1 phr.

The organic phosphite ester, preferably alkyl bisphenol-A phosphite (Phosbooster® 775), can be used preferably in an amount from about 0.5 phr to about 5 phr, and more preferably from about 2 to 3 phr. The stable alkyl pyrrolidone plasticized PVC has prolonged heat stability at temperatures higher than from about 180° C. The stability is characterized by the fact that discoloration of the PVC at processing temperature of 180° C. was shifted (or delayed) up to 50 minutes. Thereby, an excellent early color and clarity can be achieved by using Phosbooster® stabilizing system for alkyl pyrrolidone plasticized PVC.

The organic phosphite ester is believed to stabilize flexible PVC through the following mechanisms:

decomposing hydroperoxides

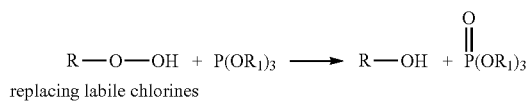

replacing labile chlorines

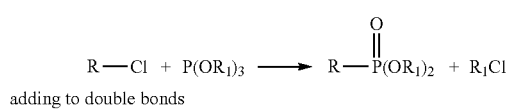

adding to double bonds

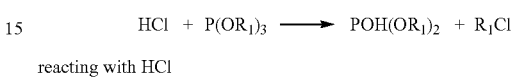

reacting with HCl

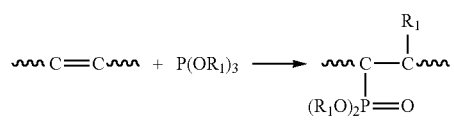

R—Cl = terminal or allylic

The PVC compositions of this invention may further comprise secondary plasticizers, stabilizers, lubricants, flame retardants and other PVC compounding ingredients. Suitably this amount of plasticizer will form advantageous plasticized PVC in such diverse forms as calendered sheets, plastisols, foams and dispersions, in applications such as films, siding, pipe or tubing to impart flexibility, softness, extensibility and lower melting temperature to the PVC.

The term "stable" as used herein refers to the alkyl pyrrolidone plasticized and organic phosphite stabilized PVC having early color which is significantly better than other conventionally used stabilizers. The better or no change in the color of the PVC after plasticization is actually reflecting the heat stability. In other words, stability refers to the long term heat stability at temperatures higher than from about 140° C. to about 200° C. Particularly, the stability of PVC at higher temperature of about 180° C. is prolonged by about 30 to 50 minutes.

A preferred class of organic phosphite ester includes the Phosbooster® series from Dover Chemicals as listed in Table 1 (reference is made to U.S. Pat. No. 7,320,764, the disclosure of which is hereby incorporated herein by reference).

TABLE 1

| Category | Name | Structure |
|---|---|---|
| | Aryl Phosphites | |
| #1 | Tris(nonylphenyl)phosphite (DOVERPHOS ® 4) | $\left[C_9H_{19}-\bigcirc-O\right]_3 P$ |
| #2 | Triphenyl phosphite (DOVERPHOS ® 10) | $\left[\bigcirc-O\right]_3 P$ |

TABLE 1-continued

| Category | Name | Structure |
|---|---|---|
| Bisphenol-A Phosphites or BPA Phosphites | | |
| #3 | Alkyl ($C_{12-15}$) BPA phosphite (DOVERPHOS ® 613) | $[(C_{12-15}H_{25-31}O)_2-P-O-C_6H_4-C(CH_3)_2-]_2$ |
| #4 | Alkyl ($C_{10}$) BPA phosphite (DOVERPHOS ® 675) | $[(C_{10}H_{21}O)_2-P-O-C_6H_4-C(CH_3)_2-]_2$ |
| Alkyl Phosphites | | |
| #5 | Triisodecyl phosphite (DOVERPHOS ® 6) | $[(iso-C_{16}H_{21})-O-]_3P$ |
| #6 | Triisotridecyl phosphite (DOVERPHOS ® 49) | $[C_{13}H_{26}-O-]_3P$ |
| #7 | Trilauryl phosphite (DOVERPHOS ® 53) | $[C_{12}H_{25}-O-]_3P$ |
| #8 | Triisooctyl phophite (DOVERPHOS ® 74) | $[(iso-C_8H_{17})-O-]_3P$ |
| Dipropylene Glycol Phophites or DPG Phosphites | | |
| #9 | Tetraphenyl DPG diphosphite (DOVERPHOS ® 11) | $[C_6H_5-O-]_2P-O-CH(CH_3)CH_2O-CH_2CH(CH_3)O-P[-O-C_6H_5]_2$ |
| #10 | Poly DPG phenyl phosphite (DOVERPHOS ® 12) | $[C_6H_5-O-]_2P-O-[CH(CH_3)CH_2O]_n-CH_2CH(CH_3)O-P[-O-C_6H_5]_2$ |
| Dialkyl/Aryl Hydrogen Phosphines | | |
| #11 | Diphenyl phosphate (DOVERPHOS ® 213) | (C_6H_5-O)_2P(=O)H |
| #12 | Diisooctyl phosphite (DOVERPHOS ® 298) | $(iso-C_8H_{17})-O-P(=O)(H)-O-(iso-C_8H_{17})$ |
| Alkyl/Aryl Phosphites | | |
| #13 | Phenyl diisodecyl phosphite (DOVERPHOS ® 7) | $C_6H_5-O-P[-O-C_{10}H_{21}]_2$ |
| #14 | Diphenyl isodecyl phosphite (DOVERPHOS ® 8) | $[C_6H_5-O-]_2P-O-C_{10}H_{21}$ |
| #15 | Diphenyl 2-ethylhexyl phosphite (DOVERPHOS ® 98H) | $[C_6H_5-O-]_2P-O-CH_2CH(C_2H_5)C_4H_9$ |
| Pentaerythritol Phosphites or PE Phosphites | | |
| #16 | Diisodecyl PE diphosphite (DOVERPHOS ® 1220) | $C_{10}H_{21}-O-P(OCH_2)_2C(CH_2O)_2P-O-C_{10}H_{21}$ |

TABLE 1-continued

| Category | Name | Structure |
|---|---|---|
| #17 | (DOVERPHOS ® 9708) | $[H_{21}C_{10}-O\!\!-\!\!_2 P-O\!\!-\!\!]_2$ ... $[-O-P(-O-C_{10}H_{21})_2]$ (spiro/pentaerythritol-type structure with four $-O-P(-O-C_{10}H_{21})_2$ groups) | p-Cumyl Phenol Phosphites or PCP Phosphites

| Category | Name | Structure |
|---|---|---|
| #18 | Mono PCP diisodecyl phosphite | Ph-C(CH$_3$)$_2$-C$_6$H$_4$-O-P(-O-C$_{10}$H$_{21}$)$_2$ |
| #19 | (DOVERPHOS ® 479) | $[(C_{12\text{-}15}H_{25\text{-}31}O)_2\!-\!P\!-\!O\!-\!C_6H_3(CH_3)(t\text{-}Bu)\!-\!C(CH_3)_2\!-\!]_2$ |

| Category | Structure | Notes |
|---|---|---|
| Bisphenol-A phosphites | $[(R^3-O)_2-P-O-C_6H_3(R^3_m)-C(CH_3)_2-]_2$ | wherein $R^3$ is as defined previously; $R^5$ is $C_{8\text{-}18}$ alkyl and preferably is $C_{10\text{-}15}$ alkyl; and m is as previously defined. |
| Polydialkyeno glycol phosphines | $[(C_6H_4(R^1_m))\!-\!O\!-\!]_2 P\!-\!O\!-\![CH_3CHCH_2O]_p\!-\!CH_2CH(CH_3)O\!-\!P[\!-\!O\!-\!(C_6H_4(R^1_m))]_2$ | wherein: $R^1$ is as previously defined; m is as previously defined; and p is an integral value from 0 to 1 inclusive. |
| Pentaerythritol phosphites | $R^4-O-P$(bicyclic pentaerythritol diphosphite)$P-O-R^4$ | wherein: $R^4$ is selected from the group consisting of $C_{8\text{-}18}$ alkyl; $C_{6\text{-}30}$ aryl, $C_{6\text{-}30}$ fused aryl rings, $C_{3\text{-}35}$ alklaryl, $C_{7\text{-}35}$ arylalkyl, and substituted derivatives thereof, wherein the substituents are selected from the group consisting of halogens, hydroxyl, $C_{1\text{-}4}$ alkyl, and $C_{1\text{-}4}$ alkoxy and further wherein more preferably. $F^4$ is the same as $R^1$. |
| p-Cumyl phenol phosphites | Ph-C(CH$_3$)$_2$-C$_6$H$_4$-O-P[-O-R$^3$]$_2$ | wherein: $R^3$ is independently selected from the troup consisting of $C_{8\text{-}18}$ alkyl; $C_{6\text{-}30}$ aryl, $C_{6\text{-}30}$ fused aryl rings, $C_{7\text{-}35}$ alklaryl, $C_{7\text{-}35}$ arylalkyl, and substituted derivatives thereof, wherein the substituents are selected from the group consisting of halogens, hydroxyl, $C_{1\text{-}4}$ alkyl, and $C_{1\text{-}4}$ alkoxy and further wherein, more preferably, $R^3$ is the same as $R^1$. |
| Aryl phosphites | $[C_6H_4(R^1_m)\!-\!O\!-\!]_3 P$ | wherein: $R^3$ is independently selected from the group consisting of H, $C_{1\text{-}13}$ alkyl, $C_{1\text{-}18}$ alkoxy, halogens, and m is an integral value from 0 to 5 inclusive, and further wherein more preferably $R^1$ is independently selected from the group consisting of H and $C_{1\text{-}9}$ alkyl; and m is an integral value from 0 to 1 inclusive. |
| Alkyl phosphites | $[R^2-O-]_3 P$ | wherein: $R^2$ is selected from the group consisting of $C_{1\text{-}18}$ alkyl and further wherein more preferably. $R^2$ is selected from the group consisting of $C_{1\text{-}15}$ alkyl. |
| Alkyl/Aryl phosphites | $[C_6H_4(R^1_m)\!-\!O\!-\!]_{3\text{-}n} P(\!-\!O\!-\!R^2)_n$ | wherein; $R^1$, $R^2$ and m are as previously defined; and n is an integral value from 1 to 2. |

The examples which follow more particularly illustrate the invention.

Example 1

Typical stabilized PVC formulations according to the invention are given in Table 2 below.

TABLE 2

| Additives | Examples No. Charge (phr) | | |
|---|---|---|---|
| | 1 | 2 | 3 |
| VESTOLIT ® B 7021* (PVC) | 100 | 100 | 100 |
| Surfadone ® LP 300 (NDP)/Surfadone ® LP 100 (NOP) | 60 | 60 | 60 |
| Baerostab UBZ 776 X** | 2.5 | | |
| Mark OBS 1200 + Mark CH305 (1:1.5)*** | | 2.5 | |
| Phosbooster ® 775 | | | 2.5 |

*Vestolit ® B 7021 (Vestolit Corp./Marl, Germany) is a S-PVC with a K value of 70
**Baerostab UBZ 776 X is Ba/Zn Stabilizer from Barlocher
***Mark OBS 1200 + Mark CH305 (1:1.5) are organic based stabilizers from Chemtura A. Preparation of Calendered Sheets Using Compositions of Table 1

Calendered sheets plasticized with the NOP and/or NDP formulations and stabilized with Phosbooster® stabilizers have better early color and clarity than Ba/Zn stabilizer or other organic based stabilizers. Sheets stabilized with Phosbooster® stabilizer resulted in much better early color/clarity and heat stability, followed by organic based stabilizers.

FIG. 1 shows the visual static test or the comparative yellowness index for the metal and organic stabilizers with Phosbooster® stabilizer. Visual determination of color change indicated the heat stability of the particular PVC. Calendered sheet plasticized with NOP/NDP and stabilized with Ba/Zn stabilizer at 180° C. showed significant discoloration after 20 minutes only. However, discoloration of the same kind of sheet at 180° C. had been increased to 30 minutes and exceptionally good results were obtained with Phosbooster stabilizer where the discoloration started only after 50 minutes.

B. Plastisols

Both NOP and NDP increased the viscosity of the plastisols indicating onset of gelation, and lowered its gelling temperature and increased the gelling. The higher alkyl pyrrolidone content along with Phosbooster® stabilizer was more suitable for achieving long open times for plastisols without discoloration.

C. Calendered Sheets

With 2.3 phr of Phosbooster® stabilizer, the processing temperature of NDP plasticized PVC could be reduced to 150° C., discoloration could not be found for 2 hours (FIG. 2) which is a significant prolongation of the heat stability of the PVC and a desirable result.

The invention composition may be used effectively in such applications as insulations and jackets for wire and cable; liners for pools, ponds, landfill, irrigation trenches; sheeting for waterbeds; fabric coating; carpet backing; automotive parts like dashboards, door panels, arm rests and other; car underbody coating; tiles; wall coverings; flooring sheets; packaging films; conveyor belts; tarpaulins; roofing membranes; electrical plug and connections; inflatable shelters; toys; garden hose; pipes and tubings; agricultural films; refrigerator and freezer gasketing; shoe soles and uppers, boots; fishing lures manufactured by using one of the state of the art technologies like calendering, extrusion, plastisol, foam, dispersion.

While the invention has been described with particular reference to certain embodiments thereof, it will be understood that changes and modifications may be made which are within the skill of the art.

What is claimed is:

1. A metal free, stable plasticized composition of polyvinyl chloride (PVC) polymer comprising:
   (a) an alkylpyrrolidone plasticizer, wherein the alkyl pyrrolidone comprises linear N-dodecyl (C12) pyrrolidone (NDP) in an amount of 5-400 phr sufficient to plasticize said PVC into a flexible state; and
   (b) alkyl bisphenol-A phosphite in an amount sufficient to prolong heat stability by delaying discoloration for at least 30 minutes at temperatures from about 140° C. to about 200° C.

2. The stable plasticized composition according to claim 1, wherein the alkyl bisphenol-A phosphite is present in an amount from about 0.5 phr to about 5 phr.

3. The stable plasticized composition according to claim 1, wherein the alkyl bisphenol-A phosphite is present in an amount from about 2 phr to about 3 phr.

4. The stable plasticized composition according to claim 1, wherein the stabilized composition has about 30 to 50 minutes longer heat stability at temperature higher than about 180° C.

5. The stable plasticized composition according to claim 1, free of heavy metal and solvent.

6. The stable plasticized composition according to claim 1, further comprising one or more primary stabilizers and other PVC compounding ingredients.

7. The stable plasticized composition of PVC polymer according to claim 1 in the form of calendared sheet, plastisol, foam, dispersions, film, siding, pipe or tubing.

* * * * *